April 5, 1927.

C. TONIOLO 1,623,606

MANUFACTURE OF NITRIC ACID

Filed Sept. 9, 1926

3 Sheets-Sheet 1

Inventor
Carlo Toniolo
By his Attorneys
Edward Sager Bower

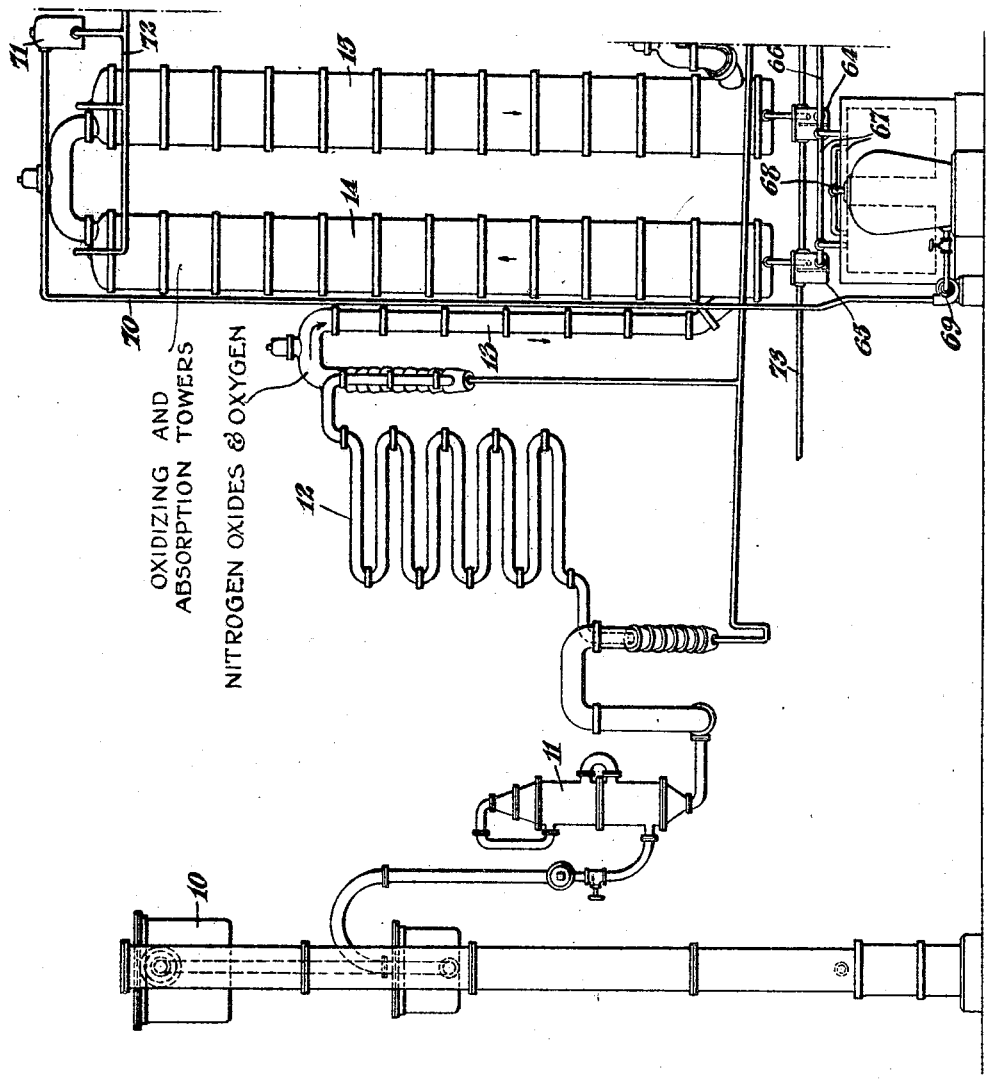

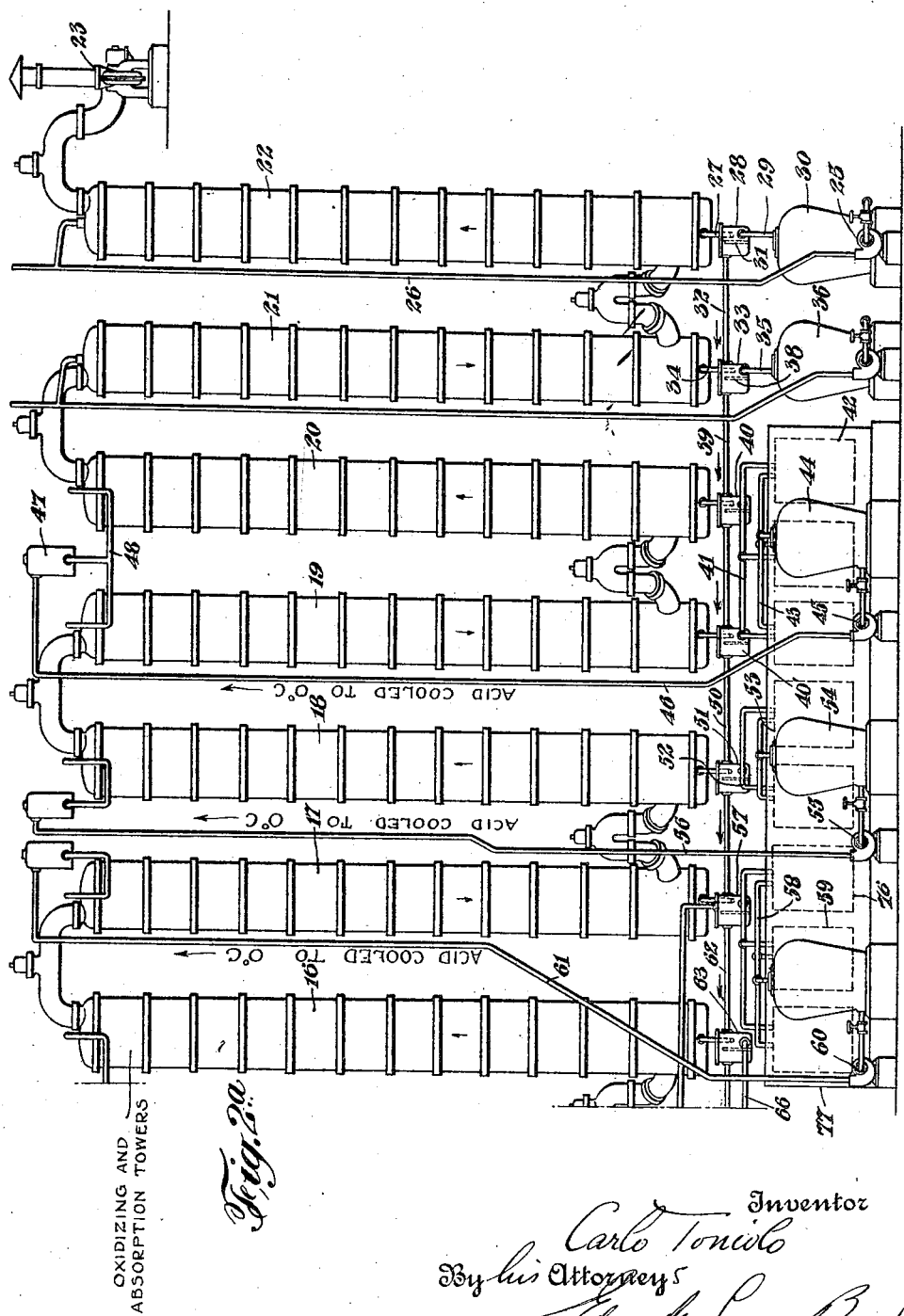

Patented Apr. 5, 1927.

1,623,606

UNITED STATES PATENT OFFICE.

CARLO TONIOLO, OF MILAN, ITALY.

MANUFACTURE OF NITRIC ACID.

Application filed September 9, 1926. Serial No. 134,341.

This invention relates to the manufacture of nitric acid and particularly to its manufacture by absorption of oxides of nitrogen by water.

The object of the invention is to provide an efficient system attaining a maximum absorption and involving simple durable apparatus with a low cost of operation and maintenance.

Further objects of the invention particularly in the utilization of a most effective temperature control will appear from the following specification taken in connection with the accompanying drawings in which—

Figure 1:
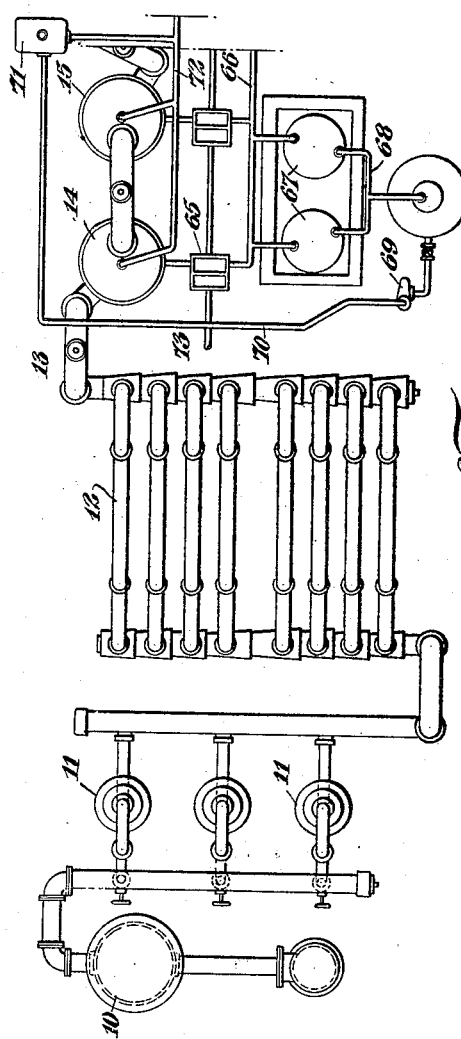
Figure 1A:
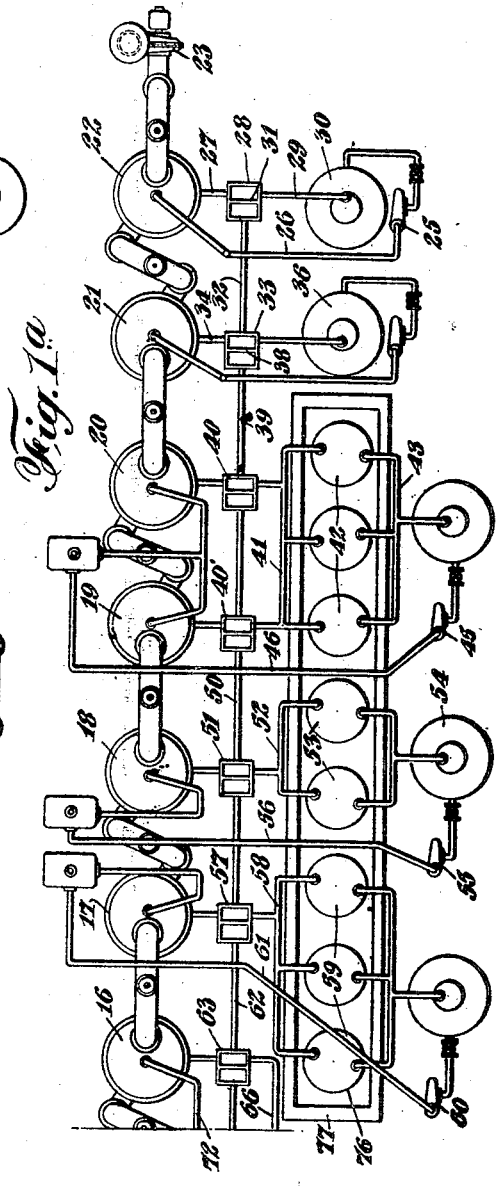

Fig. 1 is a diagrammatic plan view of a portion of a system illustrating my invention.

Fig. 1ª is a similar view of the remainder of the system.

Fig. 2 is an elevational view corresponding to Fig. 1, and

Fig. 2ª is an elevational view corresponding to Fig. 1ª.

In the system illustrated in the drawings gases including oxides of nitrogen, such as obtained from oxidation of ammonia or from oxidation of nitrogen of the air by means of electric arc or explosion or combustion or otherwise, are cooled by any suitable means down to a limit where any water vapor should be condensed, but not necessarily lower than the ordinary atmospheric temperature.

The partly cooled gases are then passed through pipe 13 into the lower portion of a tower 14 of socketed earthenware through which they pass upwardly, then downwardly through the next tower 15 and so on alternately up and down successively through the towers 16, 17, 18, 19, 20, 21 and 22 as indicated by the arrows. An exhaust pump 23 passes the residual gases out to the atmosphere and maintains within the towers a pressure not above atmosphere so as to avoid any outward leakage of the tower gases.

During this circulation of the gases through the towers they meet with a circulation of water progressively backward from tower 22 to tower 14 and forming stronger and stronger solutions of nitric acid as the liquid takes up more and more of the oxides of nitrogen. In this backward progress of the water there are a series of complete circulatory systems, starting with tower 22 at the right, each one overflowing into the next system to the left. For instance water supplied to pump 25 is pumped up through pipe 26 to the top of tower 22 and passes downward therethrough in surface contact with the gases passing upward through the tower and absorbing oxides of nitrogen from said gases. The weak acid passes out through pipe 27 to one side of the overflow tank 28 and thence by pipe 29 to the pump tank 30 connected to the suction side of the pump which recirculates this weak acid through the pipe 26 and tower 22 absorbing more and more of the nitrogen oxides and accumulating until it fills the right side of the overflow tank 28 and overflows over the partition 31 filling the left side of the tank and passing by pipe 32 to the right or circulatory side of the overflow tank 33 of the next tower system 21 to the left. This compartment of tank 33 also receives the acid through pipe 34 from the bottom of tower 21 and passes the acid through pipe 35 to pump tank 36 from which it is pumped to the top of the tower 21 and thus kept in circulation through the tower. When sufficient acid has accumulated to overflow the partition 38 of tank 33 it passes on through pipe 39 to the next overflow tank 40 of the tower 20. The acid circulating in this tower 20 is cooled, as will be hereinafter explained, and therefore the acid from the bottom of tank 40 passes through the piping 41 to a number of cooling units 42 in parallel, the cooled acid being collected by the piping 43 and passed to the pump tank 44 from which the pump 45 lifts it through pipe 46 to the distributing tank 47 dividing the acid in parallel between towers 19 and 20 by piping 48. The tank 40 receives the discharge from tower 20 and the tank 40′ receives the discharge from tower 19. tank 40 overflowing to tank 40′ and tank 40′ overflowing in turn to the next circulatory system to the left. The tanks 40, 40′ are in parallel between their tanks and the piping 41 leading to the cooling means. As the acid in towers 19, 20 becomes stronger and accumulates it overflows from tank 40′ through pipe 50 to tank 51 of the tower 18, the discharge from this tank passing through piping 52 and cooling means 53 to pump tank 54 and thence through pump 55 and pipe 56 to the top of tower 18 and back to tank 51. The acid still further strengthened in tower 18 overflows the partition of tank 51 and passes onto the tank 57 forming part of the similar circulatory system of tower 17, including the piping 58, cooling means 59, pump 60, pipe 61 and tower 17 returning the strengthened acid to the tank 57 where it overflows the partition to pass on through pipe 62 to the next circulatory system involving the three tower systems 16, 15, 14. Each of the towers 16, 15, 14 discharges into its respective overflow tank 63, 64, 65 and the tanks overflow in series 63 to 64 and 64 to 65 and 65 to the point of delivery. The tanks 63, 64, 65 in parallel are connected by piping 66 to pass their acid to the cooling means 67 connected by piping 68 to pump 69 delivering the cooled acid by pipe 70 and distributing tank 71 and piping 72 to all three towers in parallel. The acid circulating around and around in each of these towers absorbs more of the oxides of nitrogen and the strengthened acid finally accumulates so as to overflow the last tank 65 at its point of delivery 73.

In this system the general progress of the gases is from left to right and the general progress of the liquid acid is from right to left so that the weak acid is in contact with the weak gases and the strong acid with the strong gases. In each tower system or sub-circulatory system the acid is carried around and around any desired number of times in contact with the gases before it overflows and passes on to the next tower system and each of these sub-systems may be kept at desired temperature by cooling means.

Starting with the gases in the pipe 12 these are water cooled to a moderate degree, 70° F. for instance, and any condensed acid due to this cooling is run off into the appropriate tower as by piping 75. These gases include NO and an excess of oxygen which tend to combine to form $NO_2$ in the subsequent towers such as 14, 15, and 16 and this $NO_2$ in turn at low temperature tends to form $N_2O_3$ and $N_2O_4$, which are easily converted into nitric acid; so that in many of the towers changes in the nitrogen oxides are going on at the same time that the towers are used to bring about an absorption of the oxides in the circulating water or acid. To further provide for this certain of the towers such for instance as 14 and 15 may have their packing confined to zones so as to give additional oxidation spaces. The packing of the towers may be of any desired material.

The towers 14, 15 and 16 wherein a characteristic change is from NO to $NO_2$ have their circulating acid reduced in temperature by the cooling means 67. Where the temperature desired in these absorption towers is only moderate this cooling means 67 may comprise simply circulating water to cool the acid in silicon iron pipes to some moderate temperature, such as 70° F., though lower temperatures may be used if desired.

In tower 17 where a characteristic change in the oxide is from $NO_2$ to $N_2O_3$ and $N_2O_4$ a much lower temperature is maintained by refrigeration of the circulating acid in the cooling means 59 which cooling means may comprise 2″ stoneware cells 76, each one meter in diameter immersed in brine in a wrought iron trough 77 externally insulated, the trough being long enough to contain the cooling coils of tower 17 and also of towers 18, 19 and 20, eight coils in all. Refrigerated brine enters at one end of the trough 77 and passes from the other end to storage and back to the ice machine, all of the parts being carefully lagged to prevent heat losses.

I have found that the refrigeration of the acid may be most advantageously maintained in the neighborhood of 0° C. so that the brine in trough 77 is circulated at a lower temperature such as —10° C. or —20° C. cooling the acid somewhat below 0° C. such as —5° C. At these temperatures the absorption proceeds very efficiently and the heat losses are very slight and the cooling apparatus involved is small in size and inexpensive. The acid is circulated in the towers in such quantity that at the bottom it can have a temperature of 5° C. to 15° C. or even of 20° C. to 30° C. when it enters the cooling coils for recooling. The cooling by refrigeration to about 0° C. is applied also to the cooling means 53 of tower 18 and the cooling means 42 of towers 19 and 20 wherein the characteristic reaction is the conversion of $N_2O_3$ and $N_2O_4$ into nitric acid. The acid in the last towers in which there is only a small formation of nitric acid will be only slightly heated whilst it will be heated to a greater extent in the preceding towers in which the reaction with the oxides of nitrogen is much more intense and to a still greater extent in the first towers in which it is in contact with the gases which come from the oxidation towers and which would be not only richer in oxides of nitrogen but also warmer. In the last towers such as 21 and 22 cooling can be entirely dispensed with or tower 21 may have its circulation water cooled if desired.

In the system as a whole each separate circulatory system for the acid including one or more towers controls the temperature and absorption and strength of the acid with relation to the remaining circulatory systems. At the same time the general progress of the gases and the acid in opposite directions is carried on by the combinations of these circulatory systems overflowing in succession in a direction opposite to the progress of the gases. The temperature control is particularly important in providing for efficient absorption and in saving absorption space. With the temperature of the towers cooled as described only a small fraction of tower volume is required in comparison with what would be required without cooling. The formation of the desired oxides is also more perfectly controlled where the temperatures are thus regulated. At the same time extreme temperatures and expensive cumbersome refrigerating apparatus are avoided, the cooling systems utilizing simply the water cooling for moderate temperatures and the refrigeration for temperatures slightly above or below 0° C. The cooling is therefore efficient and economical.

In the system outlined in the drawings only one row of towers 14 to 22 is shown but in practice two or three or more similar rows may be used with the corresponding towers of each row connected in parallel with the corresponding tower of the row 14 to 22.

Instead of cooling the mass of acid used for feeding the towers, the mass of gas alone may be cooled rapidly (or even suddenly) to a temperature of about zero or even to one considerably below zero. The mass of gases so cooled is then introduced for the first time into an absorption tower or a group of absorption towers, in which the acid passing therethrough will not require any artificial means adapted to produce refrigerating units (such as refrigerating machines or apparatus in which evaporation of ammonia or sulphur dioxide, (or carbon dioxide) or expansion of compressed gas takes place, etc.)

In the absorption towers the acid may have any desired temperature above zero, provided that it is lower than the temperature that gives rise to the decomposition of the nitric acid already formed or to the distillation thereof from one tower to another. In the absorption towers the temperature may, for example, be between 15 and 40 degrees centigrade. However, if the reactions which determine the absorption of the oxides of nitrogen in water were to cause a heating of the circulating acid to temperatures liable to cause the dissociation or distillation of the said acid, the latter could always be cooled, for example, in coils sprinkled with water, whilst entirely avoiding the use of artificial refrigeration.

The mass of gas which issues from the first absorption tower or from the first group of absorption towers and which, naturally, will have become heated is cooled suddenly, as in the first instance, and is then caused to pass into a second absorption tower or a second group of absorption towers which are not cooled by artificial refrigeration, but at most merely by means of water, so that the temperature should be higher than that of the entering gases.

The alternate operations of rapidly cooling the gas and the reactions in the interior or relatively warm towers can be repeated several times until the absorption of the oxides of nitrogen has taken place to any desired extent or even until their complete or almost complete absorption.

If one considers that by the oxidation of ammonia there can be obtained from 1000 cubic metres of gases 600 kilogrammes of $HNO_3$ at a concentration of 50%, that for the refrigeration of the said gases it is necessary to use 15000 refrigerating units whilst for refrigerating the acid corresponding to the said production there would be required 40000, or even more, cooling units, and that if the whole of the liquid mass were cooled the heat of the reactions converting $NO_2$ into $HNO_3$ in the absorption towers would have, to a great extent, to be neutralized by means of artificial refrigeration (instead of by water at the ordinary temperature) and consequently in an expensive manner, it is more than evident that this mode of procedure of cooling the gases must represent a considerable economy of refrigerating units.

Finally, it is to be noted that the cooling of the gaseous mass may be effected in any suitable manner; by way of example may be mentioned a method which consists in passing the gases from the top to the bottom of a tower which is similar to an absorption tower and is of greater or smaller dimensions and in which there is caused to pass, also from the top to the bottom, acid suitably cooled and concentrated to such a degree that it cannot absorb any oxides of nitrogen or at least can do so only to an insignificant extent. In this tower fresh nitric acid will not be formed by any reaction between water passing therethrough and the oxides of nitrogen of the gaseous mass; at the utmost, the formation of nitric acid will be caused by condensation with the water vapor saturating the gases before the cooling is effected.

The plant set up in accordance with the present invention and with this example should be constituted by alternate cold and warm towers (or alternate groups of towers) the former of which will serve mainly for cooling the gases whilst the latter will serve essentially for absorbing the oxides of nitrogen.

The cold towers may, naturally, be replaced by coils cooled to about zero and even to below zero by any means in accordance with the end in view.

In the above description the process is operated at a pressure slightly below atmosphere; it offers the same advantages however if the towers, apparatus and accessories are suitably constructed to be operated under a pressure higher than the atmosphere.

I claim:

1. The process of manufacturing nitric acid comprising passing gases including oxides of nitrogen through a series of towers, circulating acid through said towers in a direction opposite to the general direction of progress of said gases, and cooling the acid between a plurality of intermediate towers to approximately 0° C. so that said acid as it comes into contact with said gases in said towers is approximately 0° C. in temperature.

2. The process of manufacturing nitric acid comprising passing gases including oxides of nitrogen through a series of towers alternately upward in one tower and downward in the next, circulating and recirculating acid downward in all of said towers, and cooling the acid entering a plurality of said towers to approximately 0° C. so that said acid as it comes into contact with said gases in said towers is approximately 0° C. in temperature.

3. The process of manufacturing nitric acid comprising producing nitrogen oxides in mixture with oxygen, passing said mixture through a series of absorption towers, circulating progressively stronger nitric acid in said towers opposite to the general direction of progress of said gases, and cooling said acid to substantially 0° C. in intermediate towers before it reaches its maximum strength, and subsequently circulating the stronger acid at a higher temperature through subsequent towers to strengthen it and produce the finally discharged nitric acid.

4. The process of manufacturing nitric acid comprising producing nitrogen oxides in mixture with oxygen, passing said mixture through a series of packed and open spaces in absorption towers so as to intermittently oxidize said nitrogen oxides, circulating progressively stronger nitric acid in said towers opposite to the general direction of progress of said gases, and cooling said acid to substantially 0° C. in intermediate towers before it reaches its maximum strength, and subsequently circulating the stronger acid at a higher temperature through subsequent towers to strengthen it and produce the finally discharged nitric acid.

5. The process for manufacturing nitric acid comprising producing NO mixture with oxygen, passing said mixture through a series of absorption towers, circulating progressively stronger nitric acid through said towers in a direction opposite to the general direction of said gases, cooling said acid to substantially 0° C. in intermediate towers in which $NO_2$ tends to form $N_2O_3$ and $N_2O_4$ and before said acid reaches its maximum strength, and subsequently circulating the stronger acid at higher temperature through subsequent towers in which NO tends to combine with said oxygen to form said $NO_2$ to strengthen the acid and produce the finally discharged nitric acid.

CARLO TONIOLO.